US008204180B1

(12) United States Patent
Narayanan et al.

(10) Patent No.: US 8,204,180 B1
(45) Date of Patent: Jun. 19, 2012

(54) SYSTEMS AND METHODS FOR PREVENTING SENSITIVE INFORMATION FROM BEING COMMUNICATED INTO A NON-SECURE ENVIRONMENT

(75) Inventors: Anantha Narayanan, Plano, TX (US);
Ellis K. Cave, Plano, TX (US); Bogdan Blaszczak, Coppell, TX (US); Justin Broughton, Mountain View, CA (US);
Mohan Rangarajan, Plano, TX (US)

(73) Assignee: Intervoice Limited Partnership, Las Vegas, NV (US)

( * ) Notice: Subject to any disclaimer, the term of this patent is extended or adjusted under 35 U.S.C. 154(b) by 985 days.

(21) Appl. No.: 12/188,926

(22) Filed: Aug. 8, 2008

(51) Int. Cl.
*H04M 1/64* (2006.01)
*H04L 9/00* (2006.01)
*G06F 21/00* (2006.01)

(52) U.S. Cl. .................. 379/88.04; 345/626; 348/14.01; 370/352; 376/352; 379/220.01; 380/44; 455/411; 707/694; 709/225; 709/227; 713/150; 713/167; 713/183; 713/186; 715/741; 726/1; 726/26

(58) Field of Classification Search .................. 345/626; 376/215; 379/88.04, 220.01; 455/411; 709/225, 709/227; 713/150, 167, 186, 183; 348/14.01; 370/352; 380/44; 715/741; 726/1, 26
See application file for complete search history.

(56) References Cited

U.S. PATENT DOCUMENTS

| 5,177,785 | A | 1/1993 | Itani et al. | |
|---|---|---|---|---|
| 5,930,792 | A | 7/1999 | Polcyn | |
| 6,829,613 | B1 * | 12/2004 | Liddy | 707/694 |
| 7,058,968 | B2 * | 6/2006 | Rowland et al. | 726/1 |
| 7,216,236 | B2 * | 5/2007 | Kou et al. | 713/183 |
| 7,555,092 | B2 * | 6/2009 | Russell et al. | 376/215 |
| 7,568,001 | B2 | 7/2009 | McPartlin et al. | |
| 7,623,149 | B2 * | 11/2009 | Winegard | 348/14.01 |
| 7,714,878 | B2 * | 5/2010 | Gabay et al. | 345/626 |
| 7,861,081 | B2 * | 12/2010 | Yeap et al. | 713/167 |
| 7,949,759 | B2 * | 5/2011 | Appelman | 709/227 |
| 7,949,867 | B2 * | 5/2011 | Deshpande et al. | 713/150 |
| 2002/0146668 | A1 | 10/2002 | Burgin et al. | |
| 2003/0028537 | A1 * | 2/2003 | Nakamura et al. | 707/10 |
| 2008/0005325 | A1 * | 1/2008 | Wynn et al. | 709/225 |
| 2008/0034354 | A1 | 2/2008 | Brughton | |
| 2008/0155268 | A1 * | 6/2008 | Jazayeri et al. | 713/186 |
| 2009/0036095 | A1 * | 2/2009 | Bickerstaff et al. | 455/411 |
| 2009/0265638 | A1 * | 10/2009 | Carapelli et al. | 715/741 |
| 2010/0031365 | A1 * | 2/2010 | Krishnamurthy et al. | 726/26 |
| 2010/0119063 | A1 * | 5/2010 | Deshpande et al. | 380/44 |

* cited by examiner

*Primary Examiner* — Gerald Gauthier
(74) *Attorney, Agent, or Firm* — Frost Brown Todd LLC

(57) ABSTRACT

A telecommunication system is arranged between a trusted automated interactive system and a non-secure agent. The trusted automated interactive portion is operable for bidirectional communications with a caller. The agent portion is arranged to be bridged onto a communication connection between the caller (or network chat user) and the trusted interactive system under certain conditions. Sensitive data transmitted between the system and a calling user may be blocked from being communicated to the agent even while the agent is bridged onto the connection. In one embodiment, information (such as a verification of authenticity of the caller) pertaining to the sensitive data (but not the sensitive data itself) is communicated to the agent.

32 Claims, 4 Drawing Sheets

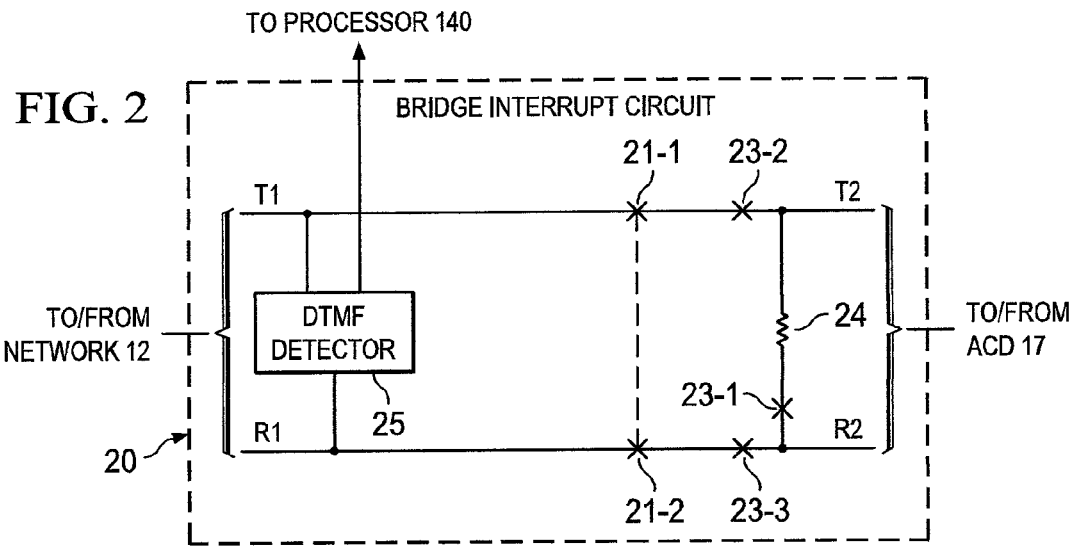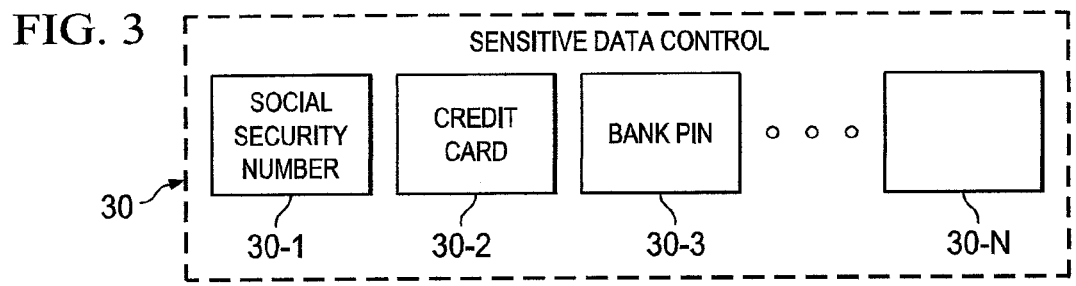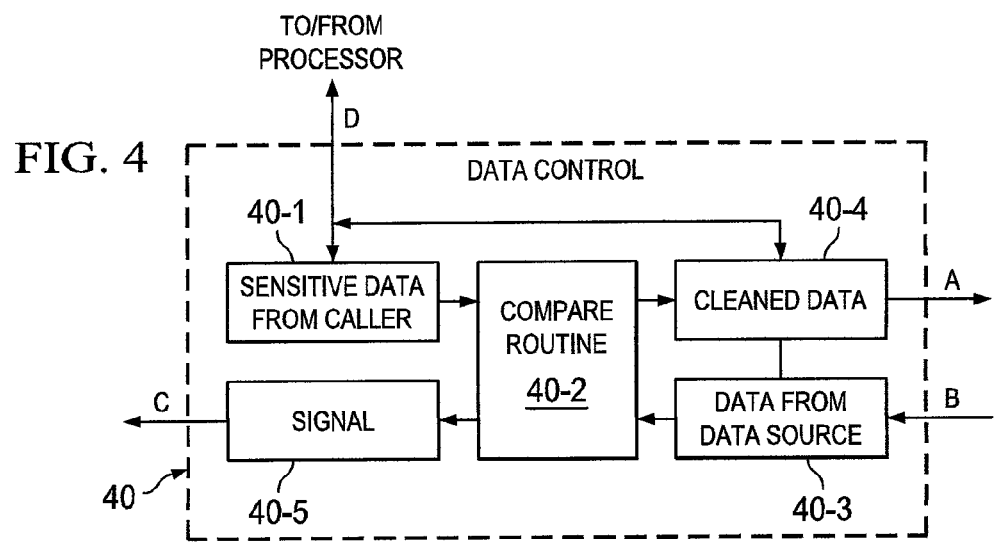

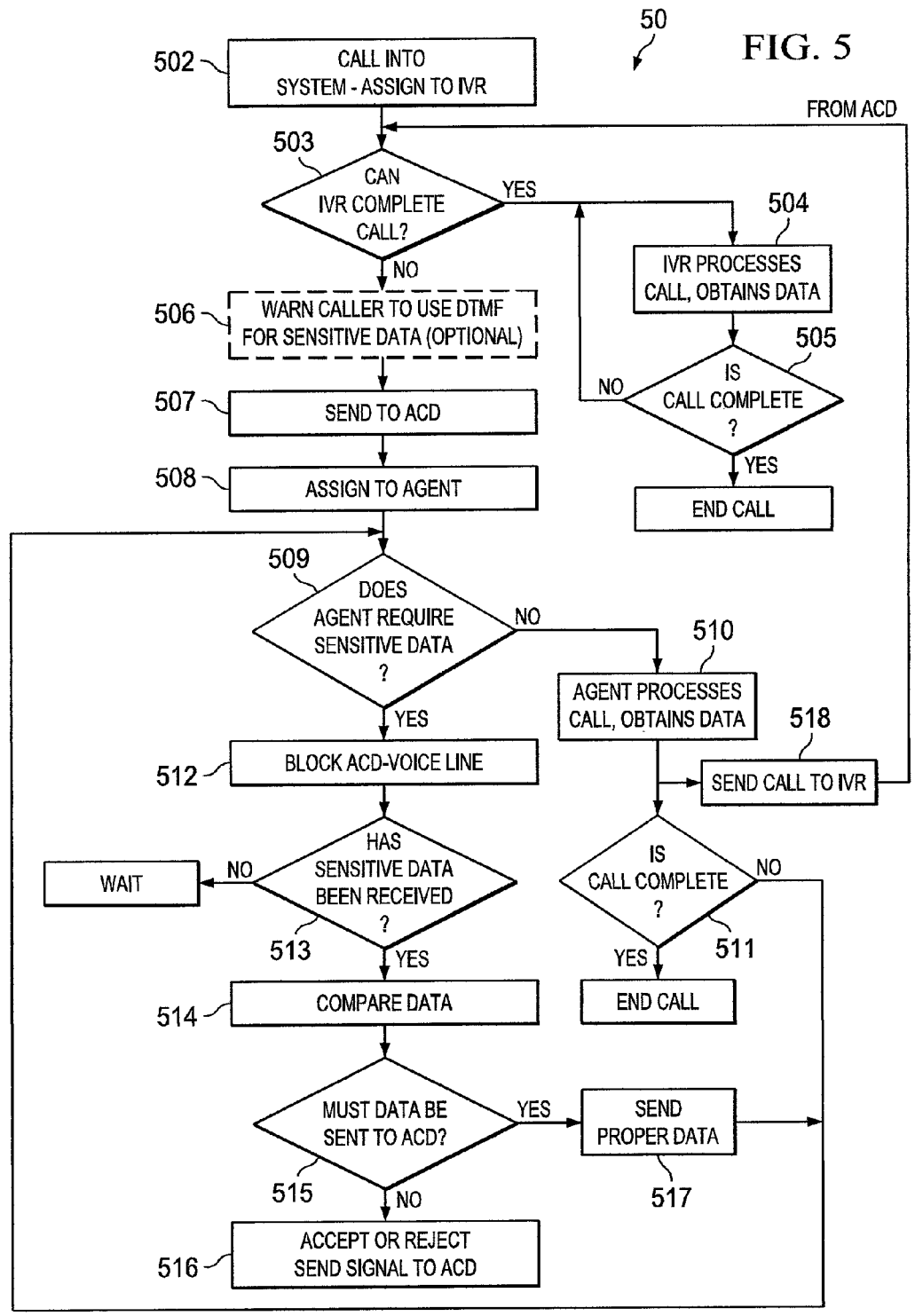

SYSTEMS AND METHODS FOR PREVENTING SENSITIVE INFORMATION FROM BEING COMMUNICATED INTO A NON-SECURE ENVIRONMENT

TECHNICAL FIELD

This disclosure relates to communication systems and specifically to systems and methods for preventing sensitive information in a call distribution system from being communicated into a non-secure environment.

BACKGROUND OF THE INVENTION

In many situations, for example, when a person interacts with an Interactive Voice Recognition (IVR) system, or when a person interacts with an agent during an on-line chat session, it is necessary to give an agent sensitive information. The delivery of such information under these circumstances is not ideal and can cause concern for the system user.

In the IVR situation, traditional call centers employ agents to answer incoming calls from users. The agents are arranged into one or more groups and the incoming calls are automatically distributed to each of the agents following well-known algorithms for such incoming call distribution. Such systems are known as automatic call distribution (ACD) systems.

In many situations, the actual incoming call is directed to an IVR which is essentially an automatic (robotic) system that initiates a dialog with the caller in an attempt to determine and, if possible, respond to, the caller's requirements The IVR is designed to attempt to satisfy as much of the caller's agenda as possible with the goal being to avoid involving a live agent to the extent possible. These systems are well-known and operate to significantly reduce per-call costs.

When the IVR is unable to satisfy the caller's requirements the incoming call then enters the ACD system and is placed in a queue waiting for the next available agent. Information collected in the IVR can be used to route the caller to an agent with appropriate skills to interact with the caller. When the caller is connected to the agent, the agent converses with the caller in an attempt to resolve any remaining issues. When all the remaining issues are settled, the agent disconnects the call.

During the conversation between the calling user and the agent, the agent often must perform a task for the caller, such as charging a credit card, or accessing a specific record. This process may require that the caller reveal sensitive information to the agent, such as a credit card number, a social security number, birthdates, passwords, addresses, phone numbers, email addresses, etc. Typically, this sensitive information is used by the agent to help resolve an issue, such as the identity of the calling user, or the identity of a document. Some calling users are concerned about the exposure of such information to a person (the agent) that they do not know and who often is located in a country foreign to where the calling user is located. Since privacy concerns may not be uniform around the world, calling users are justified in their concern.

The outsourcing of call center and even chat-room agents to foreign countries has greatly exacerbated the security problem. Using modern networking technologies, call centers are able to locate agents in locations where labor costs are lower. In these scenarios, it becomes difficult to control the exposure of private information. Certain types of applications can run afoul of various privacy, such as HIPPA in the US and the EDDP (European Directive on Data Protection) in the EU.

BRIEF SUMMARY OF THE INVENTION

A telecommunication system is arranged between a trusted automated interactive system and a non-secure agent. The trusted automated interactive portion is operable for bidirectional communications with a caller. The agent portion is arranged to be bridged onto a communication connection between the caller (or network chat user) and the trusted interactive system under certain conditions. Sensitive data transmitted between the system and a calling user may be blocked from being communicated to the agent even while the agent is bridged onto the connection. In one embodiment, information (such as a verification of authenticity of the caller) pertaining to the sensitive data (but not the sensitive data itself) is communicated to the agent.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 2, 3 and 4 show embodiments of control circuitry used in the system shown in FIG. 1;

FIG. 5 shows one embodiment of a method for operating the system shown in FIG. 1.

DETAILED DESCRIPTION OF THE INVENTION

Figure 1:
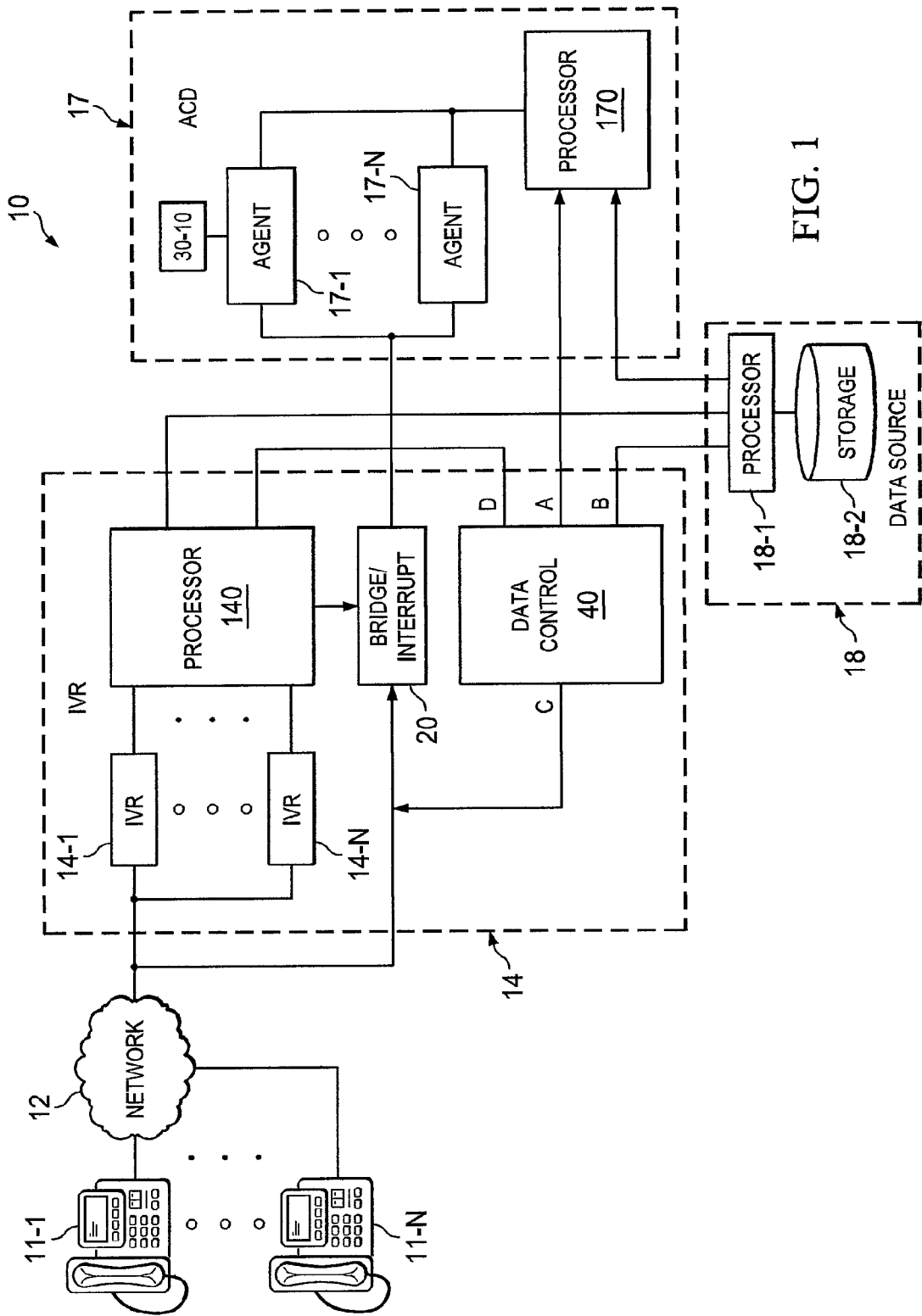
FIG. 1 shows one embodiment of a block diagram of a telecommunication system using the concepts of the invention.

FIG. 1 shows one embodiment of a block diagram of telecommunication system 10 using the concepts of the invention. Calling user 11-1, desiring to obtain some information from a data source, such as source 18, dials the appropriate telephone number and the call is routed, as is well-known, via network 12 to an IVR system, such as IVR system 14, associated with the called number. The data source can be a bank, an airline, a merchant selling products or services, etc. The data source can contain banking information, airline reservations, merchandise codes, etc. Note that system 10 can be thought of as an IVR system, an ACD distribution system, a telecommunications answering system or simply a call center.

In operation, the incoming call to IVR 14 is assigned an available one of the IVR devices 14-1 to 14-N. The assigned IVR then processes the incoming call as is well-known, by a series of outward voice prompts to the calling user. The calling user, in response to a voice prompt, replies, either by voice or by DTMF signaling. The connected IVR device then passes the response to a processing unit(s), such as to processor 140, to decode the caller's response. If data is requested, and after a proper verification of identity, PIN number, etc., the IVR interacts with data source 18 under control of processors 140 and 18-1 and storage 18-2.

If the IVR device is unable to satisfy all of the caller's issues, the IVR places a call to the call center's ACD, such as to ACD 17. Note that ACD 17, or at least a portion of the ACD, may be located physically remote from the IVR system. As discussed above, the IVR portion and the agent portion can even be in a different countries.

In a typical call center, when the ACD answers, the IVR would transfer the call to the ACD and drop off the line. This would be accomplished, for example, by bridge circuit 20 or by processor 140 establishing a new connection. At this point, the IVR device would become removed from the call, and the IVR port would be free to take a new call. Meanwhile, ACD 17, under control of, for example processor 170, would place the caller on hold, and would queue the caller waiting for an available human agent, selected from agents 17-1 to 17-N. When an agent, such as agent 17-1, is available, the ACD would connect the caller to the selected available agent.

In one embodiment, at this point, instead of transferring the caller to the ACD system, the IVR conferences the ACD system into the call. Thus, the IVR remains on the calling connection essentially in parallel with the ACD. Bridge circuit 20 can control such a conference connection. By remaining on the call, the IVR maintains control of the conference bridge, and thus remains on the call's audio path, for the duration of the call. The IVR can then monitor the full conversation between the caller and the agent, and, as will be discussed in more detail, mute or block the audio from the caller to the agent when required.

When the IVR determines that the caller must talk to a live agent, the IVR informs the caller that the caller will be connected to the next available agent. However, in one embodiment, as will be discussed with respect to FIG. 5 before connecting to the agent, the IVR can instruct the caller that any sensitive information required by the agent should be entered using their Touch-Tone (DTMF) keypad, instead of speaking the information to the agent. This can be explained as a security measure. The caller can also be instructed by the IVR that the agent will not be able to hear any data entry.

In one embodiment, the agent has a set of buttons, such as button set 30, representing the various sensitive data entries that may be required during the call. As shown in FIG. 3, if during the call the agent (or the non-secure portion of the system) needs to have the calling user provide sensitive information for any purpose the agent, in one embodiment, operates the button corresponding to the desired sensitive information. For example, if the user's social security number is required, button 30-1 is enabled. If credit card information is required then button 30-2 is enabled. Likewise for any other buttons 30-3 to 30-N. Note that button set is shown as a separate device but can be incorporated on the agents screen as, for example, soft keys. Also, the agent could simply spell out the desired information on a key pad. The data from the operation of the sensitive key would trigger the still connected IVR. The IVR in turn would mute the voice line between the calling user and agent while maintaining a communication connection between the IVR and the calling user and also while maintaining the agent active with respect to this same calling user. The IVR now acts as the trusted agent and prepares to validate the sensitive information provided by the calling user.

FIG. 2 shows one embodiment of mute or interrupt circuit 20 in which the closure of switches 21-1, 21-2 enables the voice connection between the calling user network connection (T1, R1) and ACD 17 (lines T2, R2) while the closure of switch 23-1 places impedance 24 across the T2, R2 leads to the ACD. The concurrent opening of switches 23-1, 23-3 separates the IVR from the ACD during the muting (interrupt) operation. Note that circuit 20 is but one of many methods for enabling the muting operation which could also be performed entirely within switching network 12 or within a switching network (not shown) between IVR 14 and ACD 17. Note also that in some embodiments where the original IVR actually disconnected the signals from sensitive keys 30 would cause the connection of a new IVR. This new IVR can be at the same location as the original IVR or can be located separately from the original IVR, perhaps even co-located with the ACD or the agents.

When the connection between the calling user and the ACD has been muted the IVR then prompts the caller to speak or key in the desired sensitive information. When the IVR receives the desired information from the calling user the IVR access the callers' records. This access can be accomplished any number of well-known ways. Note that by placing control 20 in front of IVR (instead of in parallel therewith) it is possible to also cut off the audio to the IVR, if desired.

FIG. 4 illustrates one system using data control 40 for allowing the IVR to access the sensitive information from data source 18 and store the accessed information temporarily in buffer 40-3. The information from the user is temporarily stored in buffer 40-5. Compare routine 40-2, which could be a stand-alone comparison circuit, but preferably would reside in a processor, such as processor 140 or processor 18-1, determines if the provided information matches the stored information and if so a signal is provided to the IVR via signal circuit 40-5. The IVR then removes the mute circuit and passes on, or enables the conduit of the proper non-sensitive information to the connected agent. The connected agent then can resume his/her interaction with the calling user. Depending upon the embodiment, the IVR can then again remain silently bridged or drop off the connection.

The type of information passed to the agent from the IVR in response to the provision of the sensitive information could be a simple "yes" or "no" indicating, for example, that a PIN has been matched or that the credit card information has been received and is valid. In some situations, more complex data corresponding to the sensitive information might be sent from the IVR to the ACD, or the ACD agent might be given further access to data from a data source, such as data source 18 or some other data source. In some situations it may be appropriate for the IVR to run one or more multi-prompt scripts between itself and the calling user before removing the mute control. Also, the mute might be set up in such a manner, perhaps using 4-wire circuitry, such that the agent can actually hear the prompts to the calling user but can not hear the response back. Using this procedure it is possible to remove any desired sensitive information in the callers' record while still allowing the agent to process the call.

In another embodiment, instead of requiring the agent to use sensitive keys 30 the agent simply asks the user to provide the information. In this embodiment, the calling user would be instructed, whether by the IVR before being connected to the ACD, or by the agent, to use DTMF for transmitting any sensitive information. Under such a situation, the IVR would be equipped to detect DTMF, for example, by using DTMF detector 25 in circuit 20. Thus, when detector 25 "hears" the first tone on the line the mute control is enabled (as discussed above) and the IVR then records the information from the calling user. Once the information is received the IVR can continue with appropriate prompts, if desired, or can remove the mute and as discussed above, present the sanitized data to the agent.

Keeping the IVR in the audio path during the call also provides other benefits. With the IVR monitoring the audio, the application can give the caller, or the system, an option to record any portion of the agent discussion (or even the IVR portion of the call). If the calling user is to control the recording, or other services available from the IVR, then the calling user can be given a key or set of keys on the calling user's dialing pad to enable/disable the desired IVR function. The recording can be sent via email to the caller after the call completes. Processor 140 can control this function.

If, during the conversation with the agent, it is determined that the IVR can handle a specific task, the caller or agent can request that the agent be released from the call, and the caller returned to the IVR dialog to complete the task. This could be one of the features enabled by the caller or by the agent either of whom could enable the proper dialing key or set of keys.

FIG. 5 shows one embodiment 50 of a method for operating the system shown in FIG. 1. Process 501 accepts a call into the IVR system and assigns the calling user to an available IVR. Process 503 determines at what point, if any, the IVR can no longer handle the call without agent intervention. Until such a determination, process 504 processes the call and obtains whatever data the calling user desires, all in the well-known manner for IVR systems. When process 505 determines the call is complete it is ended.

When process 503 determines that the call must be routed to an ACD system, such to system 17, FIG. 1 (or to any other type of system) for assistance then process 506, optionally, warns the calling user that the call is being transferred and that any sensitive information should be entered using the user's key pad (DTMF). As discussed above, in some situations this will not be necessary since the IVR would have already muted the agent's voice path. Process 507 then sends the call to the ACD system or to some other system for further handling of the call. Depending upon the embodiment being used, the IVR may be disconnected but preferably would remain on a bridged connection with the ACD.

Process 508, usually running at the ACD system, then assigns an available agent to the connection. Process 509 determines if and when the agent requires sensitive information. Until such information is required, processes 510 and 511 proceed in the normal manner to allow the agent to dialog with the calling user and to obtain information from data source 18 all under control of processors 170 and 18-1.

When process 509 determines that sensitive data is required, process 512 operates to mute the line to the ACD so that the agent can not hear the sensitive data. As discussed above, this can be done in any of a number of ways. The original IVR could have remained on the line or a new IVR can be added. This can occur because the agent provided a signal to the IVR, via key box 30 or otherwise, or because the IVR detected DTMF or other signals on the voice line. Also, the line can be muted under control other than the IVR.

Process 513 waits for all of the sensitive data to be received and when it is all received then process 514 compares the received data against expected data. If a proper match is made but only the results must be communicated to the ACD, then an accept or reject signal is sent to the ACD by process 516. If more data is to be sent, or made available to the ACD then process 515 in conjunction with process 516 sends the proper data, or makes the data available to, the ACD. Both processes 516 and 517 terminate in the agent again taking charge of the calling connection.

In some situations, the agent may decide that the call should be returned for processing by an IVR. In such a situation, processes 510 and 518 send the call to the IVR system for subsequent completion.

Figure 6:
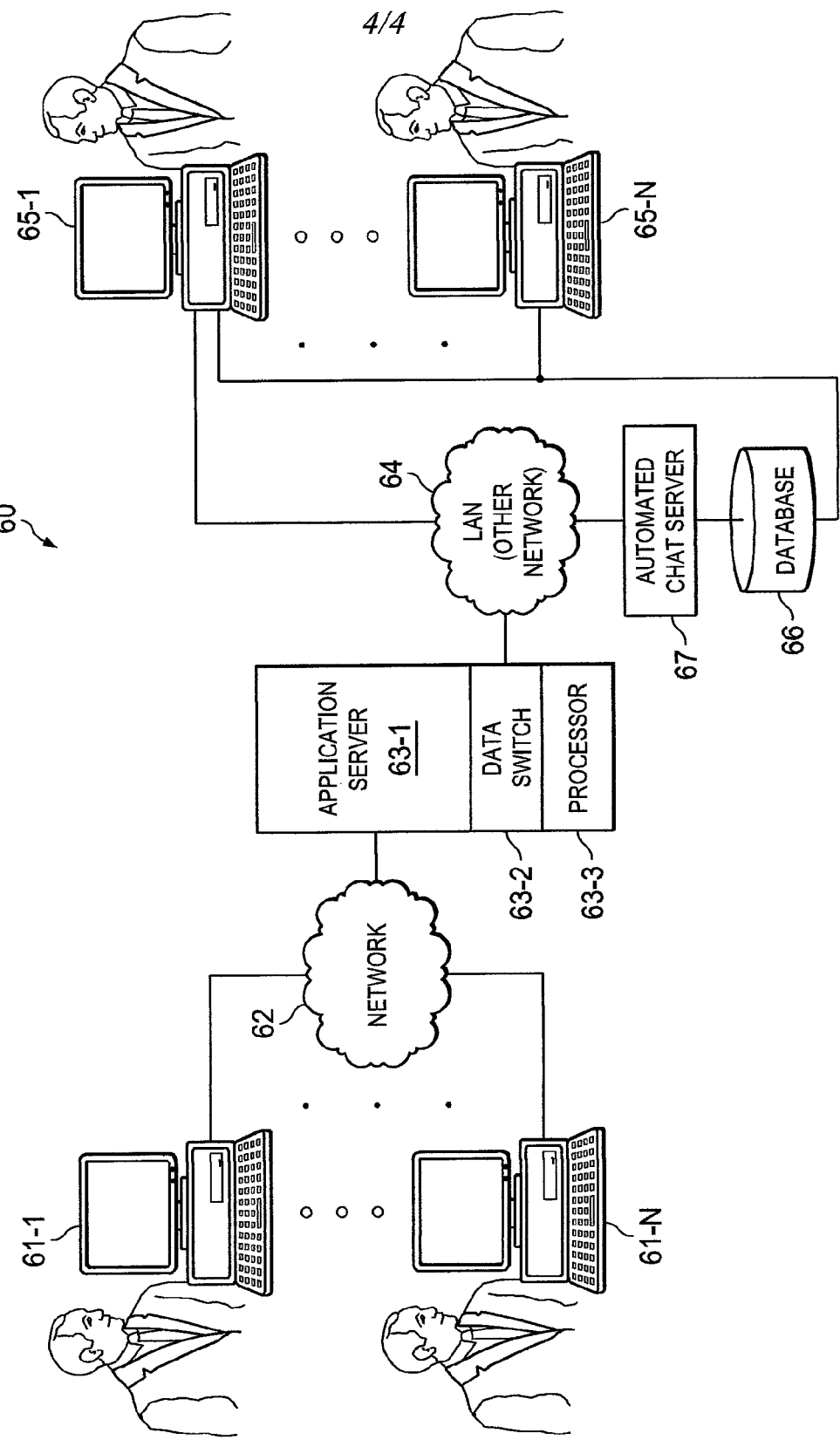
FIG. 6 shows one embodiment of a network chat system using the concepts of the invention.

FIG. 6 shows one embodiment 60 of a system in which the concepts discussed herein can be used during a network chat session. A user connects to the chat network from a terminal, such as from terminal 61-1, via network 62. Network 62 would ideally be a digital network, such as the Internet, and could be wireline or wireless or a combination thereof. In operation, terminal 61-1, or any one or more of terminals 61-1 through 61-N, would connect through the network to application server 63-1 and data switch 63-2 which in turn, connects the user to an agent selected from agent pool 65-1 to 65-N via network 64. Network 64 can be a LAN or a portion of network 62 or a combination thereof. This then allows the user at terminal 61-1 to text chat with an agent, such as agent 65-1. In one embodiment, LAN 64 is a dedicated network.

When sensitive information is required, for example, when the agent needs credit card information from the chat-user, the chat session is switched to an automated "chat bot", such as chat server 67. Such switch is controlled, at least in part, by data switch 63-2 operating under control, for example, of processor 63-3. Data switch 63-2 then directs the sensitive information to chat server 67 and database 66 while preventing the data from passing through network 64 to the agent. Data switch 63-2 can operate to keep agent 65-1 active on the connection but block, or encrypt, the information such that agent 65-1 can not receive the data in an intelligent format. Thus, in one embodiment, the data from user 61-1 can continue to flow to the connected agent but since the sensitive data is being encrypted in a manner such that only the chat server can intelligently use it, it is safe from theft or other misuse. For even greater security, the data can be prevented from passing to the agent for a period of time, or until the sending user signals, perhaps by a special key stroke, that he/she is finished sending sensitive data. A specific key stroke from the agent could, for example, be the trigger to block all data from the agent until a specific key stoke is received from the sending user.

After the sensitive data is delivered to the trusted intermediary, i.e. the chat server, the system then could allow other information pertaining to the sensitive date to be delivered to the agent. An example of this would be a verification of credit, or verification of a PIN, or a name associated with an account number, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communication system comprising:
   a. a trusted user interactive portion, said interactive portion operable for bidirectional communications with a user;
   b. an agent portion arranged such that an agent can be in bidirectional communications with said user; and
   c. means for establishing a communication connection, for a period of time, between said trusted user interactive portion and said user while said user is in bidirectional communication with said agent; and
   d. means for preventing selected portions of a communication from said user to said trusted user interactive portion from also being communicated to said agent.

2. The system of claim 1 wherein said means for preventing selected portions of a communication from said user to said trusted user interactive portion from also being communicated to said agent comprises:
   a muting circuit for allowing audio signals to be communicated from said user to said trusted intermediary while preventing said communicated audio signals from also being communicated to said agent.

3. The system of claim 1 wherein said trusted portion is an automated IVR system.

4. The system of claim 3 wherein said trusted portion and said agent portion are at separate physical locations.

5. The system of claim 3 wherein said IVR remains bridged to said communication connection even when said agent portion has also been bridged onto said communication connection with said user.

6. The system of claim 3 wherein said means for preventing selected portions of a communication from said user to said trusted user interactive portion from also being communicated to said agent comprises:
   a. circuitry in said IVR system for detecting certain data being communicated over said communication connections, and
   b. circuitry for temporarily inhibiting communication from said user to said agent portion while said certain data is detected.

7. The system of claim 6 wherein said certain data comprises DTMF tones.

8. The system of claim 7 wherein said certain data is data used by said agent portion for authentication of said user.

9. The system of claim 8 wherein said IVR system provides authentication to said agent portion based upon receiving said certain data from said user.

10. The system of claim 1 wherein said user is a text message user.

11. The system of claim 10 wherein said means for preventing selected portions of a communication from said user to said trusted user interactive portion from also being communicated to said agent comprises:
    a. a data switch in a server; and
    b. a LAN for directing communication from the user to an automated server and not to the agent.

12. A method of handing telecommunication connections, said method comprising:
    handling with a trusted intermediary at least a portion of bidirectional communications with a system user;
    handling with a non-secure agent at least a portion of certain of said bidirectional communications, said non-secure agent requiring access to data defined by sensitive information in the possession of said system user; and
    inhibiting sensitive information from said system user from being communicated to said non-secure agent while being communicated to said trusted intermediary.

13. The method of claim 12 wherein said inhibiting comprises: intercepting said sensitive information by said trusted intermediary.

14. The method of claim 13 wherein said trusted intermediary comprises an IVR device.

15. The method of claim 14 wherein said IVR device is one of a plurality of IVR devices available for handling calling connections incoming from any one of a plurality of said system users.

16. The method of claim 15 wherein said non-secure agent is one of a plurality of non-secure agents available for handling communication connections in conjunction with any one of said IVR devices on an as-needed basis.

17. The method of claim 16 wherein at least one of said non-secure agent is a live agent.

18. The method of claim 12 wherein said trusted intermediary and said non-secure agent are located at physical locations remote from each other.

19. The method of claim 12 wherein said non-secure agent is in text communication with said system user.

20. The method of claim 19 wherein said system user is connected to said agent via at least one server on a data network and wherein said agent is connected to said server via a dedicated network.

21. The method of claim 20 wherein said trusted intermediary is also connected to said dedicated network.

22. The method of claim 21 wherein said inhibiting comprises:
    separating data communication from said system user away from said non-secure agent.

23. A telecommunication system in which incoming voice calls are answered by a robot operator and the robot operator bi-directionally interacts with a calling user without human intervention, and wherein the calling user is placed into a communication connection with a human agent when the robot operator needs assistance in meeting the needs of the calling user; said telecommunication system comprising:
    a. circuitry for determining when said human agent requests sensitive data from a calling user;
    b. circuitry for preventing sensitive data supplied by said calling user from being communicated to said human agent; and
    c. a processor for accepting said sensitive data from said calling user and for providing to said human agent an indication of proper/improper verification of authenticity of said calling user;
    wherein said sensitive data is required by said human agent for verification of authenticity of said calling user.

24. The system of claim 23 wherein said robot operator and said human agent are at separate physical locations.

25. The system of claim 24 wherein:
    a. said robot operator is one of a plurality of IVR devices available for handling calling connections incoming from any one of a plurality of said calling users; and
    b. said human agent is one of a plurality of agents available for handling communication connections in conjunction with any one of said IVR devices on an as-needed basis.

26. A telecommunication system in which incoming voice calls are answered by a robot operator and the robot operator bi-directionally interacts with a calling user without human intervention, and wherein the calling user is placed into a communication connection with a human agent when the robot operator needs assistance in meeting the needs of the calling user; said telecommunication system comprising:

a. means for determining when said human agent requests sensitive data from the calling user; and
b. means for preventing sensitive data supplied by said calling user from being communicated to said human agent; and
c. a processor for accepting said sensitive data from said calling user and for providing to said human agent an indication of proper/improper verification of authenticity of said calling user;

wherein said sensitive data is data required by said human agent for verification of authenticity of said calling user.

27. The system of claim 26 wherein said robot operator and said agent are at separate physical locations.

28. The system of claim 26 wherein:
a. said robot operator is one of a plurality of IVR devices available for handling calling connections incoming from any one of a plurality of said calling users; and
b. said agent is one of a plurality of agents available for handling communication connections in conjunction with any one of said IVR devices on an as-needed basis.

29. A method comprising:
a. a trusted intermediary providing one or more prompts to a system user;
b. the trusted intermediary receiving one or more responses from the system user;
c. a non-secure agent continuing an interaction initiated by the trusted intermediary by engaging in bi-directional communication with the system user;
d. inhibiting sensitive information from the system user from being communicated to the non-secure agent while being communicated to the trusted intermediary by performing acts comprising, during the interaction, preventing a response from the system user to a request to provide sensitive information from being provided to the non-secure agent; and
e. after inhibiting the sensitive information from said system user from being communicated to said non-secure agent while being communicated to said trusted intermediary, the non-secure agent resuming the interaction, wherein resuming the interaction comprises the non-secure agent engaging in further bi-directional communication with the system user.

30. The method of claim 29, wherein:
a. when, during the interaction, the non-secure agent requires access to data defined by sensitive information in the possession of said system user, the non-secure agent operates a sensitive information button from a plurality of sensitive information buttons;
b. the operated sensitive information button corresponds to the sensitive information in possession of the system user which defines the data the non-secure agent requires access to; and
c. based on the operation of the sensitive information button corresponding to the sensitive information in possession of the system user which defines the data the non-secure agent requires access to, the trusted intermediary provides the system user the request to provide the sensitive information.

31. The method of claim 29, wherein:
a. the request to provide the sensitive information and an additional request to provide sensitive information are provided to both the system user and the non-secure agent; and
b. a response from the system user to the additional request to provide sensitive information is prevented from being provided to the non-secure agent.

32. The method of claim 29, wherein:
a. a comparison is performed between the response from the system user to the request to provide the sensitive information and expected data; and
b. a result of the comparison is provided to the non-secure agent for use in the further bi-directional communication with the system user.

* * * * *

UNITED STATES PATENT AND TRADEMARK OFFICE
CERTIFICATE OF CORRECTION

PATENT NO.      : 8,204,180 B1
APPLICATION NO. : 12/188926
DATED           : June 19, 2012
INVENTOR(S)     : Narayanan et al.

Page 1 of 1

It is certified that error appears in the above-identified patent and that said Letters Patent is hereby corrected as shown below:

Column 7, Claim 12, line 60, reads "...A method of handing..."; which should be deleted and replaced with "...A method of handling..."

Signed and Sealed this
Fourteenth Day of August, 2012

David J. Kappos
*Director of the United States Patent and Trademark Office*